United States Patent
Chen et al.

(10) Patent No.: US 10,928,862 B2
(45) Date of Patent: Feb. 23, 2021

(54) ELECTRONIC DEVICE HAVING HANDLE

(71) Applicant: Acer Incorporated, New Taipei (TW)

(72) Inventors: Wei-Chang Chen, New Taipei (TW); Jung-Wei Tsao, New Taipei (TW); Yun Cheng, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/595,469

(22) Filed: Oct. 8, 2019

(65) Prior Publication Data

US 2021/0026405 A1 Jan. 28, 2021

(30) Foreign Application Priority Data

Jul. 26, 2019 (TW) ................................ 108126533

(51) Int. Cl.
*G06F 1/16* (2006.01)
*H05K 5/00* (2006.01)
*H05K 7/00* (2006.01)

(52) U.S. Cl.
CPC .................... *G06F 1/166* (2013.01)

(58) Field of Classification Search
CPC ...... G06F 1/166; G06F 1/1613; G06F 1/1633; G06F 1/1656
USPC ................ 361/679.21–679.3, 679.57–679.59
See application file for complete search history.

(56) References Cited

U.S. PATENT DOCUMENTS

| | | | | |
|---|---|---|---|---|
| 5,293,300 A | * | 3/1994 | Leung | G06F 1/1616 361/679.59 |
| 6,017,106 A | * | 1/2000 | Adams | A45C 13/22 312/223.2 |
| 7,948,753 B2 | * | 5/2011 | Wang | G06F 1/1628 361/679.59 |
| 8,508,938 B2 | * | 8/2013 | Luo | G06F 1/203 361/679.59 |
| 8,670,233 B2 | * | 3/2014 | Huang | G06F 1/1613 361/679.59 |
| 8,848,366 B2 | * | 9/2014 | Kawada | G06F 1/1632 361/679.59 |
| 9,408,317 B1 | * | 8/2016 | Luo | F16M 13/04 |
| 9,471,096 B2 | * | 10/2016 | Kuo | G06F 1/16 |
| 9,930,795 B2 | * | 3/2018 | Chang | A45F 5/10 |
| 2006/0196235 A1 | * | 9/2006 | Fan | G06F 1/1616 70/77 |

(Continued)

FOREIGN PATENT DOCUMENTS

| | | |
|---|---|---|
| CN | 103576767 | 2/2014 |
| CN | 105828547 | 8/2016 |

(Continued)

*Primary Examiner* — Anthony M Haughton
(74) *Attorney, Agent, or Firm* — JCIPRNET

(57) ABSTRACT

An electronic device includes a device main body, a handle and a positioning mechanism. The handle is adapted to be connected to the device main body in a first state, and is adapted to be connected to the device main body in a second state. The positioning mechanism includes a positioning member and an unlocking assembly. The positioning member is movably disposed on the handle. The positioning member is adapted to position the handle to the first state and adapted to position the handle to the second state. The unlocking assembly is movably disposed on the handle and is adapted to remove positioning of the positioning member acted on the handle.

10 Claims, 18 Drawing Sheets

(56) References Cited

U.S. PATENT DOCUMENTS

| | | | | |
|---|---|---|---|---|
| 2012/0075799 A1* | 3/2012 | Pollex | ............... | G06F 1/1622 |
| | | | | 361/679.56 |
| 2012/0257342 A1* | 10/2012 | Shindo | ............... | H05K 5/023 |
| | | | | 361/679.02 |
| 2018/0049332 A1* | 2/2018 | Chang | ............ | A45F 5/10 |

FOREIGN PATENT DOCUMENTS

| | | |
|---|---|---|
| TW | M394496 | 12/2010 |
| TW | 201915650 | 4/2019 |

\* cited by examiner

ELECTRONIC DEVICE HAVING HANDLE

CROSS-REFERENCE TO RELATED APPLICATION

This application claims the priority benefit of Taiwan application serial no. 108126533, filed on Jul. 26, 2019. The entirety of the above-mentioned patent application is hereby incorporated by reference herein and made a part of this specification.

BACKGROUND

Technical Field

The invention relates to an electronic device, and particularly relates to an electronic device having handle.

Description of Related Art

Portable electronic devices such as notebook computers and tablet computers have been popular in the consumer market for a long time. In addition to portable electronic devices for general household or commercial use, there are also portable electronic devices for military regulations, industrial and outdoor use, and such portable electronic device usually use a soft cloth fixing belt installed at the bottom of the device to fix the device and the user's hand so that the user may firmly hold the portable electronic device. However, when the portable electronic device is placed on a desktop, the soft cloth makes the device unstable and easy to shake during an input operation such as typing or touch control.

SUMMARY

The invention is directed to an electronic device, which is adapted to avoid shaking during an input operation.

The invention provides an electronic device including a device main body, a handle and a positioning mechanism. The handle is adapted to be connected to the device main body in a first state, and is adapted to be connected to the device main body in a second state. The positioning mechanism includes a positioning member and an unlocking assembly. The positioning member is movably disposed on the handle. The positioning member is adapted to position the handle to the first state and adapted to position the handle to the second state. The unlocking assembly is movably disposed on the handle and is adapted to release positioning of the positioning member acted on the handle.

In an embodiment of the invention, the handle is adapted to be detachably connected to a first position of the device main body to present the first state, and the handle is adapted to be detachably connected to a second position of the device main body to present the second state.

In an embodiment of the invention, the first position is located at a back side or a front side of the device main body, and the second position is located at a bottom of the device main body.

In an embodiment of the invention, the handle is rotatably connected to the device main body, and the handle is adapted to be rotated to a first position relative to the device main body to present the first state, and the handle is adapted to be rotated to a second position relative to the device main body to present the second state.

In an embodiment of the invention, the first position is located at a back side or a front side of the device main body, and the second position is located at a bottom of the device main body.

In an embodiment of the invention, the unlocking assembly includes a releasing member and a locking member, the releasing member is slidably disposed on the handle and is adapted to push the positioning member to release positioning of the positioning member acted on the handle, and the locking member is slidably disposed on the handle and is adapted to lock the releasing member.

In an embodiment of the invention, the locking member has a stop portion, and the stop portion is adapted to stop one of the releasing member and the positioning member.

In an embodiment of the invention, the positioning member has a guide surface, the releasing member is adapted to move along a first direction to push the guide surface to drive the positioning member to move along a second direction, and the guide surface is not parallel with the first direction and the second direction.

In an embodiment of the invention, the positioning member includes a positioning column, and the positioning column is adapted to insert into the device main body to position the handle to the device main body.

In an embodiment of the invention, the device main body has a rotation shaft, the handle is rotatably connected to the rotation shaft, the positioning member includes an engaging portion, and the engaging portion is adapted to be engaged to the rotation shaft to prevent the handle from rotating.

Based on the above description, in the electronic device of the invention, the handle may be connected to the device main body in two states, so as to respectively provide a lifting function and a stable holding function. When the electronic device is placed on a desktop, even if the handle is located between the desktop and the electronic device, since the handle is not the conventional soft cloth fixing belt, it will not make the device unstable and cause shaking of the device during an input operation such as typing or touch control.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
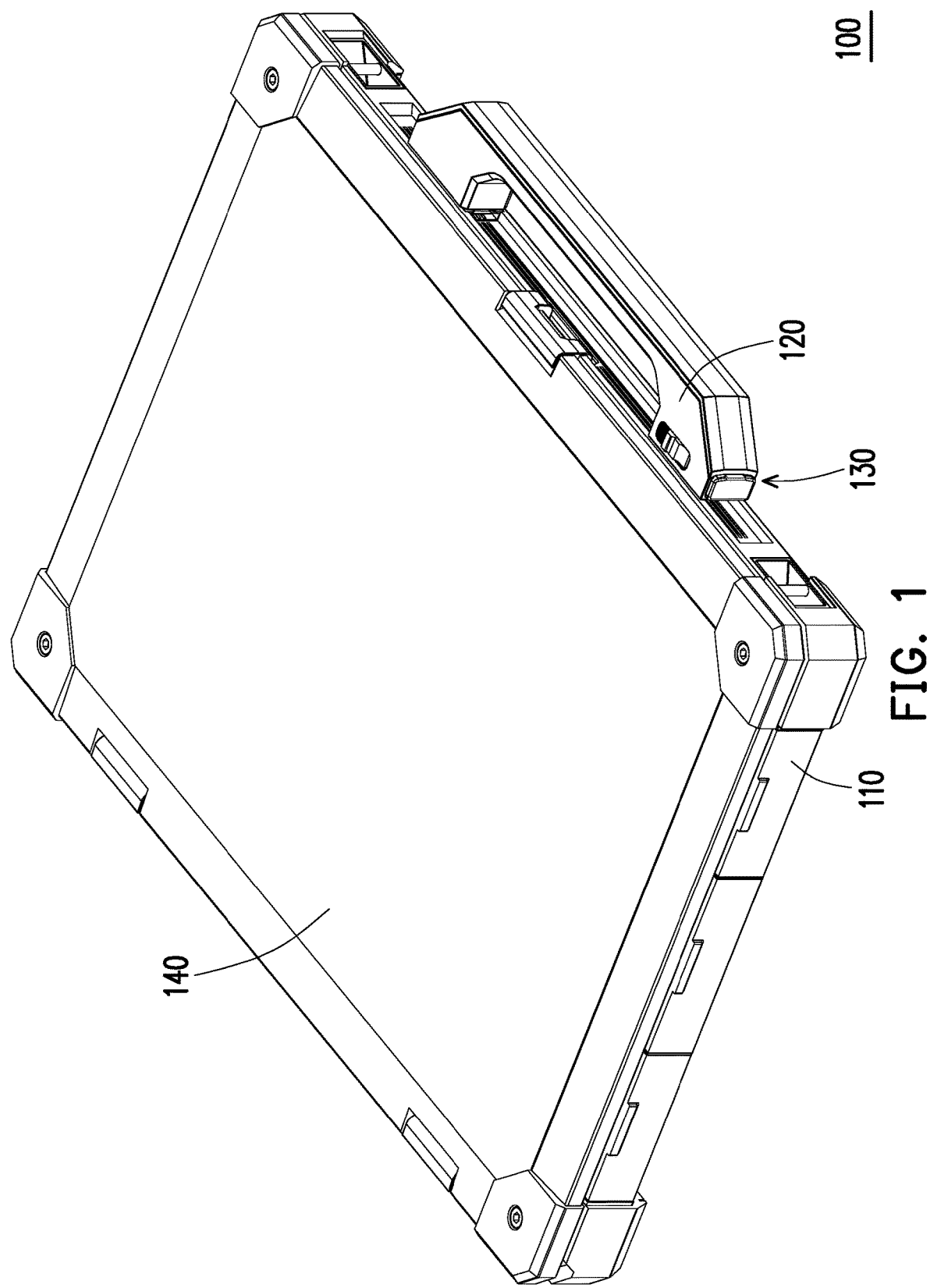
FIG. 1 is a three-dimensional view of an electronic device according to an embodiment of the invention.
Figure 2:
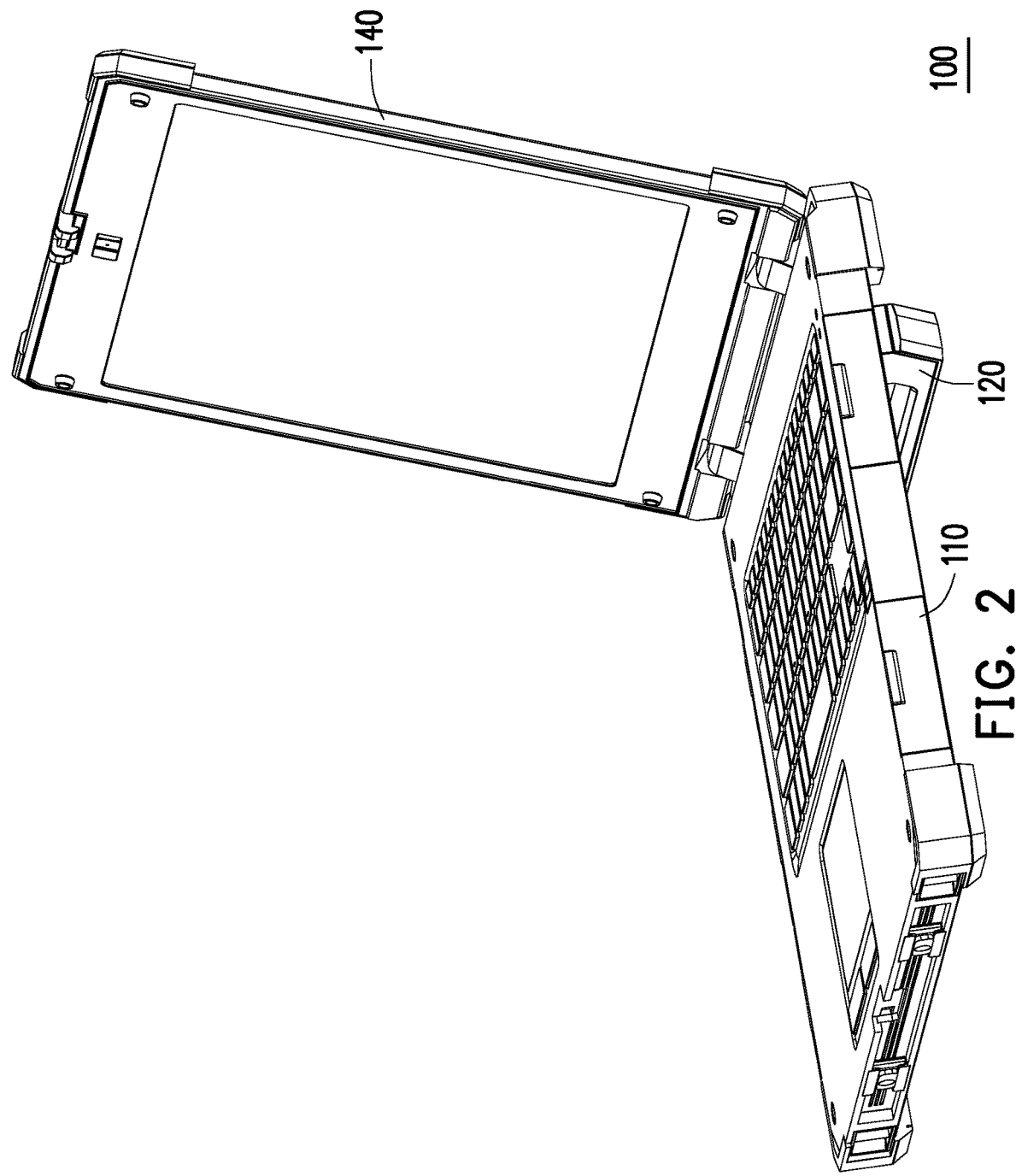
FIG. 2 illustrates a state change of a handle of FIG. 1.

FIG. 1 is a three-dimensional view of an electronic device according to an embodiment of the invention. FIG. 2 illustrates a state change of a handle of FIG. 1. Referring to FIG. 1 and FIG. 2, the electronic device 100 of the embodiment is, for example, a notebook computer, and includes a device main body 110, a handle 120 and a positioning mechanism 130. The device main body 110 is, for example, a host of the notebook computer, and the electronic device 100 may further include a display 140 pivotally connected to the device main body 110. The display 140 may be closed to the device main body 110 as shown in FIG. 1 or unfolded relative to the device main body 110 as shown in FIG. 2. The handle 120 is adapted to be detachably connected to a first position of the device main body 110 in a first state as shown in FIG. 1, and the handle 120 is adapted to be detachably connected to a second position of the device main body 110 in a second state as shown in FIG. 2.

The first position is, for example, located at a front side of the device main body 110, and the handle 120 located at the front side of the device main body 110 is adapted to be lifted by a user. The second position is, for example, located at a bottom of the device main body 110, and the handle 120 located at the bottom of the device main body 110 is adapted to be held be the user when the user supports the bottom of the device main body 110 by a single hand. Moreover, the handle 120 located at the bottom of the device main body 110 may lift the device main body 110 away from its placement surface, so as to reduce a dirt contact degree of the device main body 110 in military, industrial use or outdoor environments, and enhance flow efficiency of a heat dissipation airflow at the bottom of the device main body 110. The positioning mechanism 130 is configured to position the handle 120 to the first state or the second state.

Figure 3:
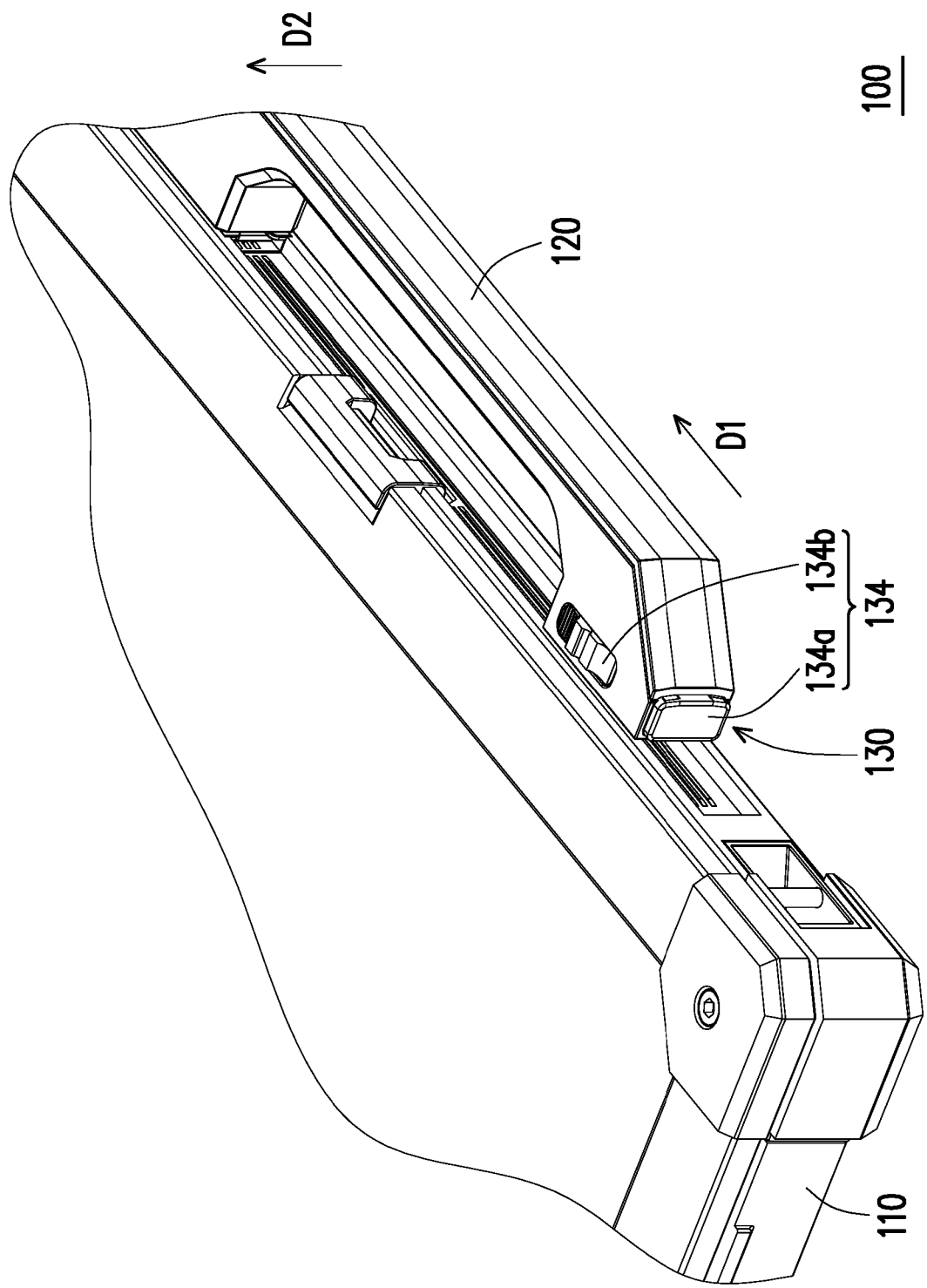
FIG. 3 is a partial three-dimensional view of the electronic device of FIG. 1.
Figure 4:
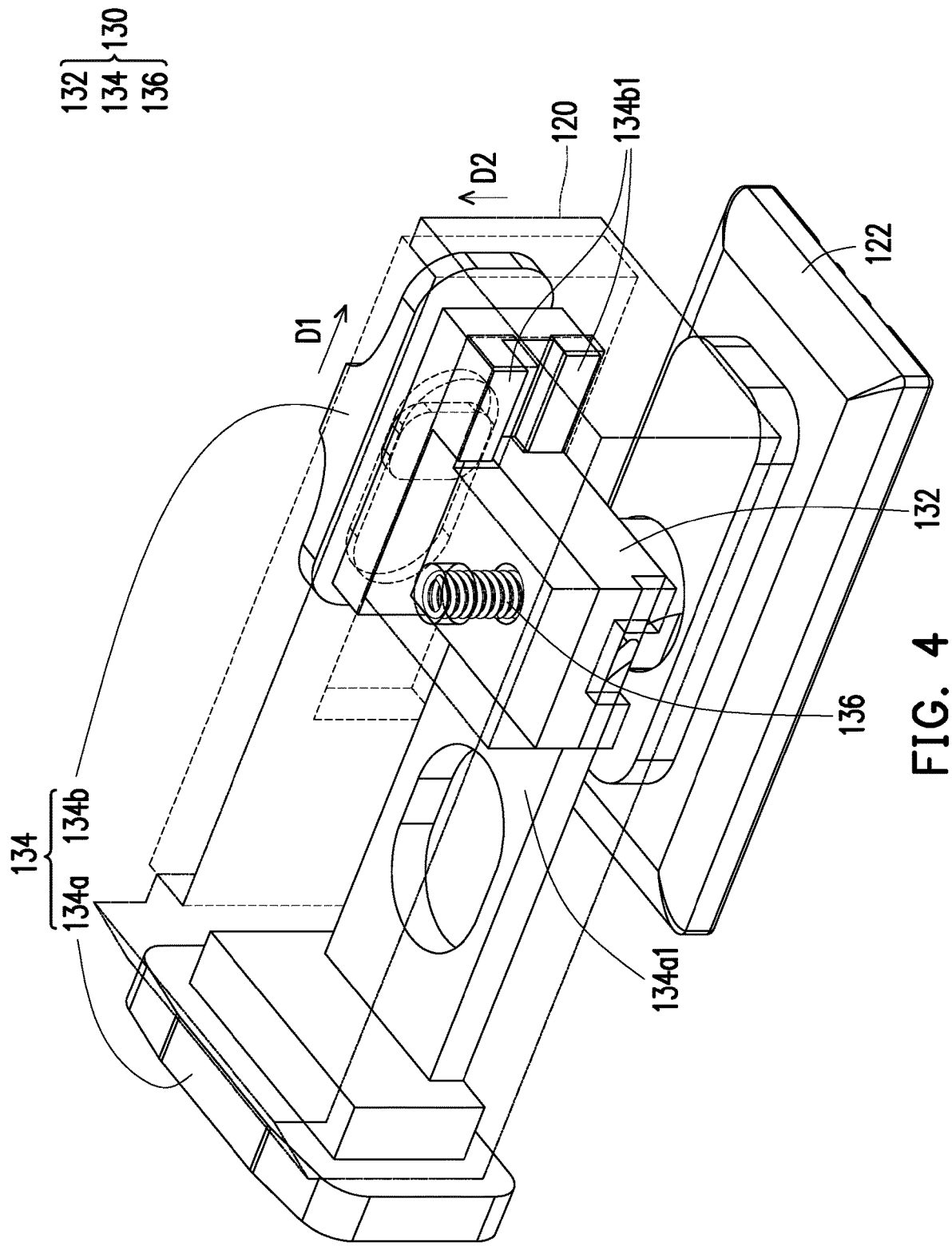
FIG. 4 is a three-dimensional view of the positioning mechanism of FIG. 3.
Figure 5:
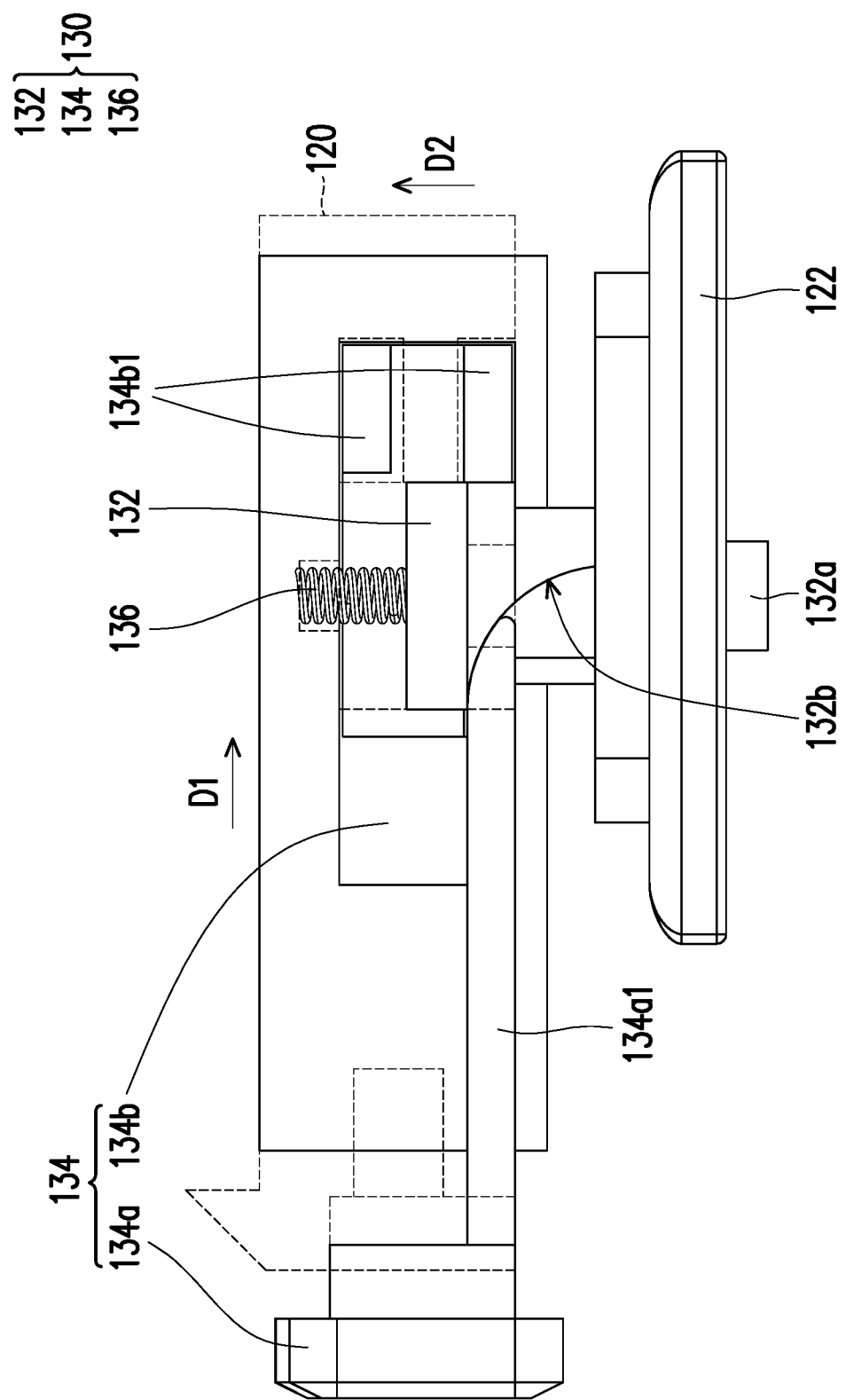
FIG. 5 is a side view of the positioning mechanism of FIG. 3.

FIG. 3 is a partial three-dimensional view of the electronic device of FIG. 1. FIG. 4 is a three-dimensional view of the positioning mechanism of FIG. 3. FIG. 5 is a side view of the positioning mechanism of FIG. 3. Referring to FIG. 3 to FIG. 5, the positioning mechanism 130 of the embodiment includes a positioning member 132 and an unlocking assembly 134. The positioning member 132 is movably disposed on the handle 120, and is adapted to position the handle 120 to the first state or the second state. The positioning member 132, for example, positions the handle 120 to the device main body 110 by inserting a positioning column 132*a* thereof into the device main body 110. The unlocking assembly 134 is movably disposed on the handle 120 and is adapted to release positioning of the positioning member 132 acted on the handle 120.

In detail, the unlocking assembly 134 of the embodiment includes a releasing member 134*a* and a locking member 134*b*. The releasing member 134*a* is slidably disposed on the handle 120 in a first direction D1, and is adapted to push the positioning member 132 through an extension portion 134*a*1 thereof to release positioning of the positioning member 132 acted on the handle 120. The locking member 134*b* is slidably disposed on the handle 120 in the first direction D1 and is adapted to lock the releasing member 134*a*. The locking member 134*b*, for example, stops the positioning member 132 through a stop portion 134*b*1 thereof, so as to lock the releasing member 134*a* linked to the positioning member 132. Detailed operations of the members are introduced below.

Figure 6:
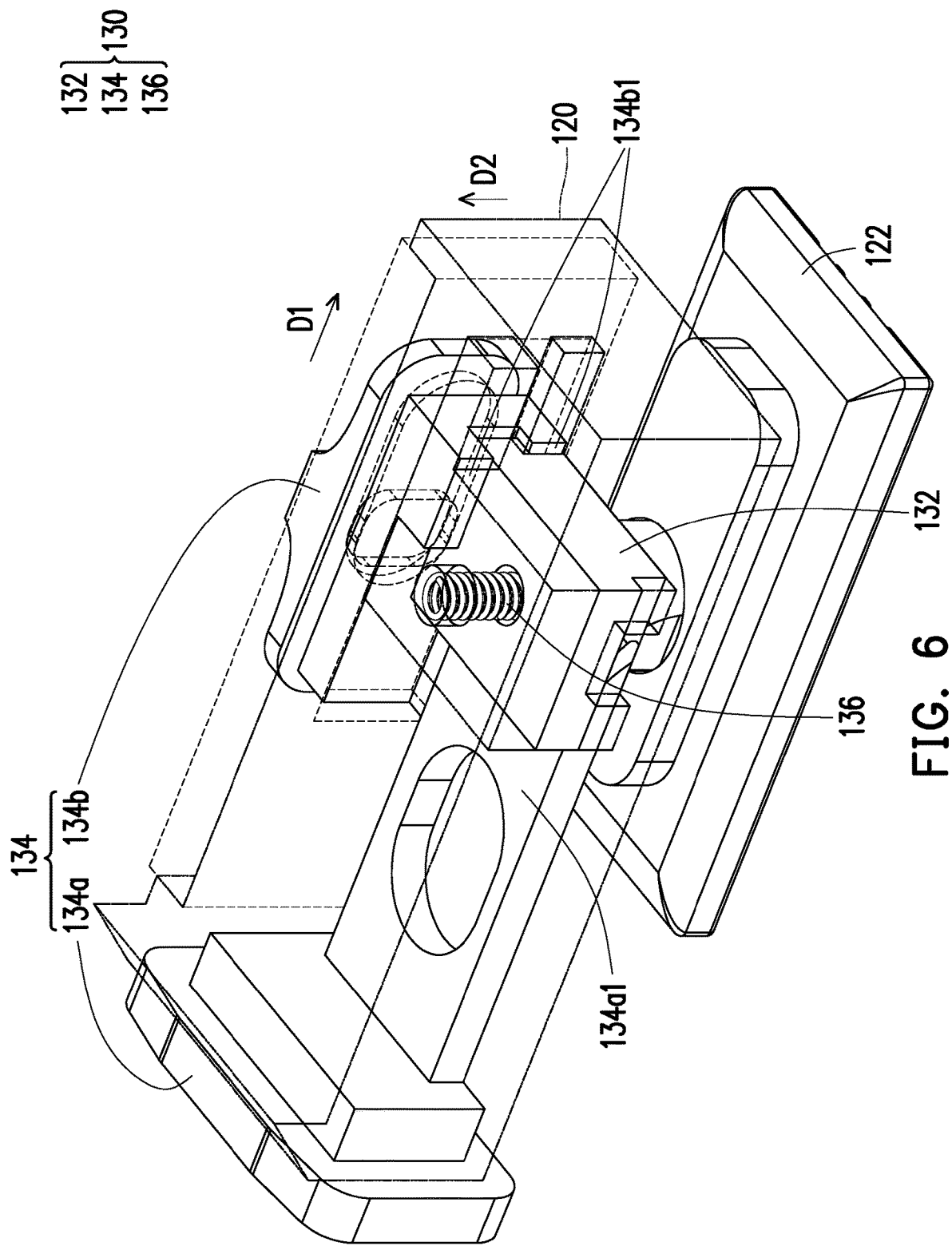
FIG. 6 illustrates movement of a locking member of FIG. 4.
Figure 7:
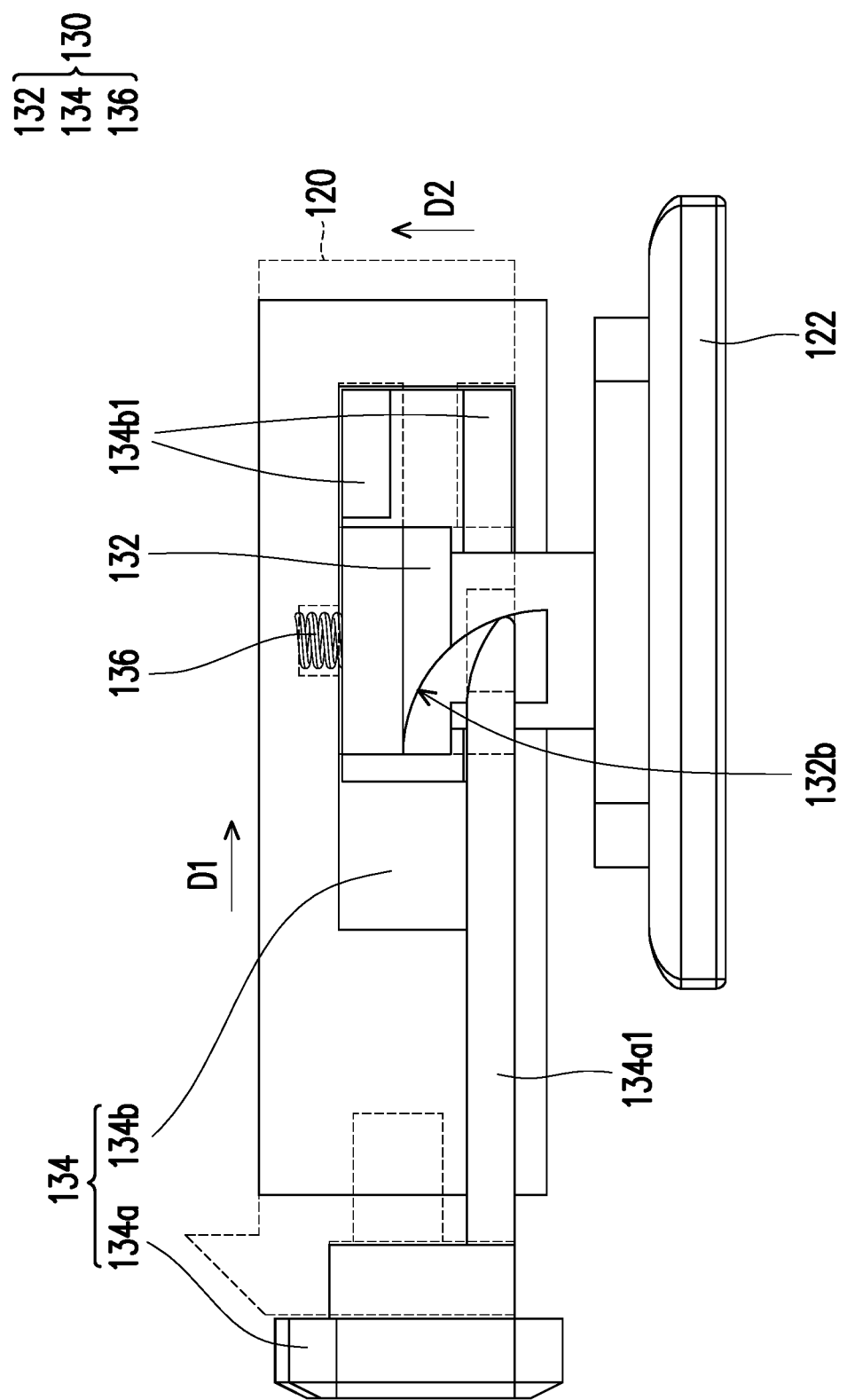
FIG. 7 illustrates movement of a releasing member and a positioning member of FIG. 5.

FIG. 6 illustrates movement of the locking member of FIG. 4. FIG. 7 illustrates movement of the releasing member and the positioning member of FIG. 5. When the user wants to change the handle 120 from the first state shown in FIG. 1 to the second state shown in FIG. 2, the user may first push the locking member 134*b*, and the locking member 134*b* is moved from a position shown in FIG. 4 to a position shown in FIG. 6 along the first direction D1, and now the stop portion 134*b*1 of the locking member 134*b* is misaligned with the positioning member 132, so that the positioning member 132 and the releasing member 134*a* are not locked by the locking member 134*b*. Then, the user may press the releasing member 134*a*, and the releasing member 134*a* is moved from a position shown in FIG. 5 to a position shown in FIG. 7 along the first direction D1, and now a guide surface 132*b* of the positioning member 132 is pushed by the releasing member 134*a* to move the positioning member 132 from the position shown in FIG. 5 to the position shown in FIG. 7 along a second direction D2 perpendicular to the first direction D1, and the positioning column 132*a* of the positioning member 132 is moved away from the device main body 110. The guide surface 132*b* of the positioning member 132 is, for example, an arc surface unparallel to the first direction D1 and the second direction D2.

Figure 8A:
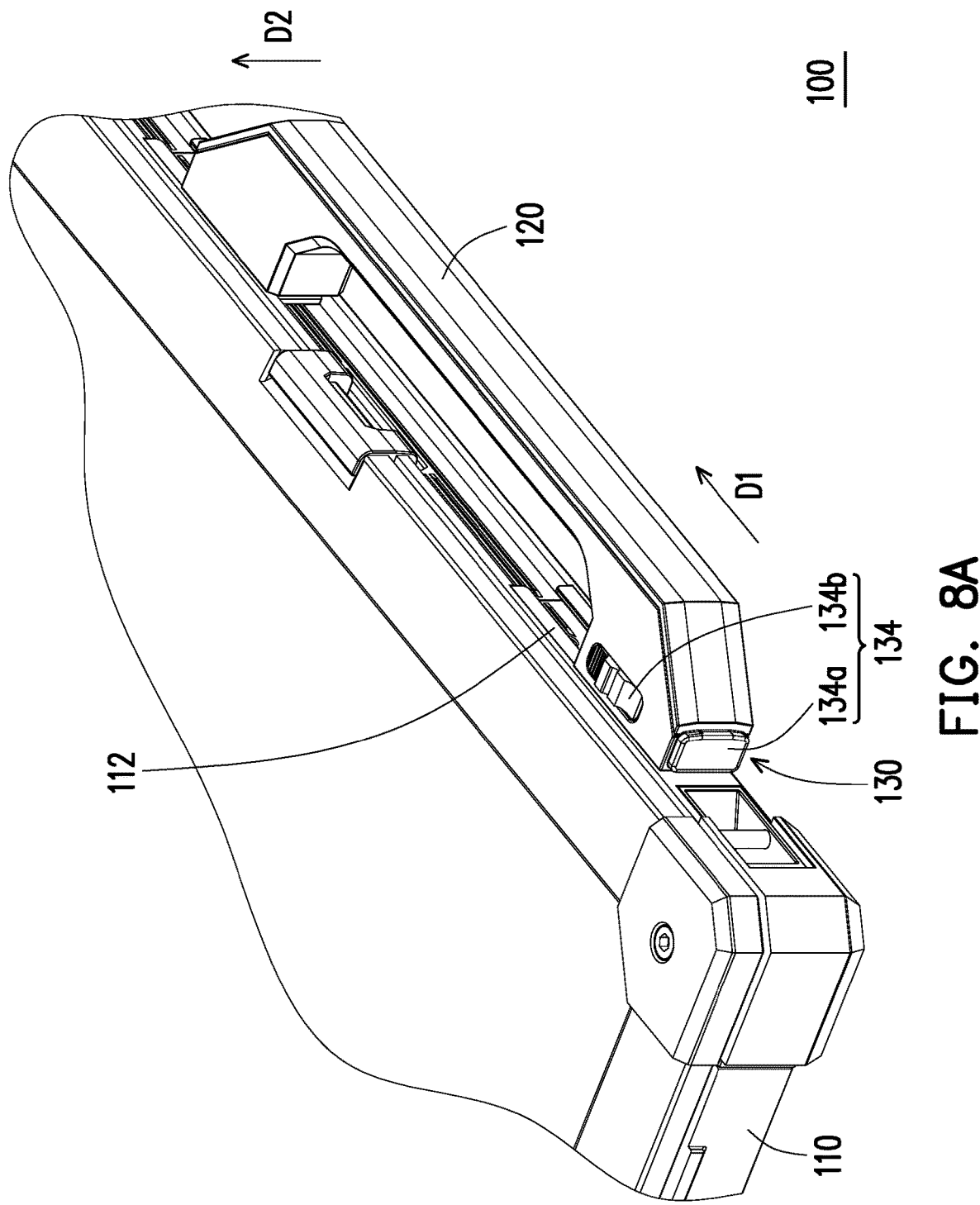
FIG. 8A to FIG. 8C illustrate an operation flow of a handle of FIG. 3.
Figure 8B:
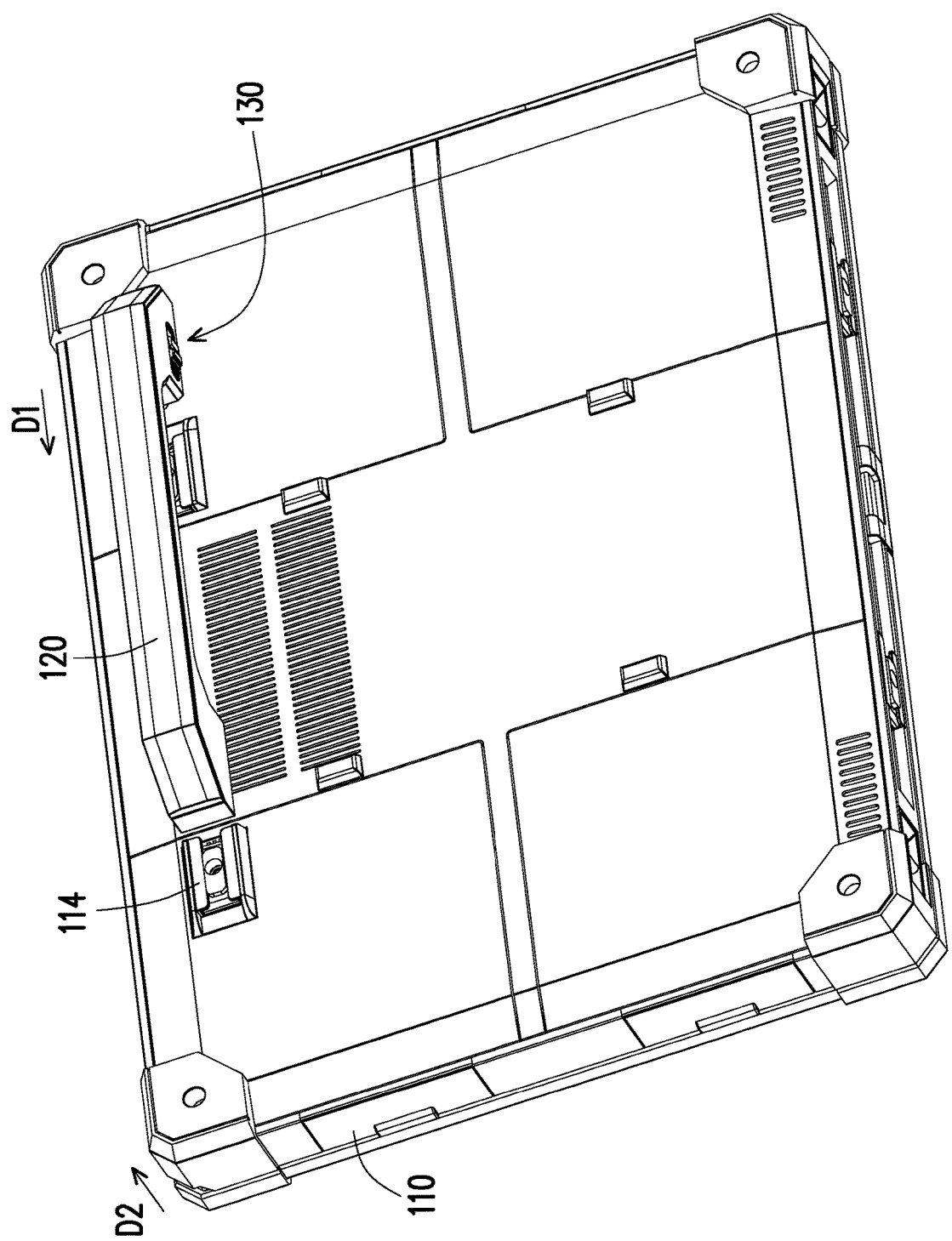
Figure 8C:
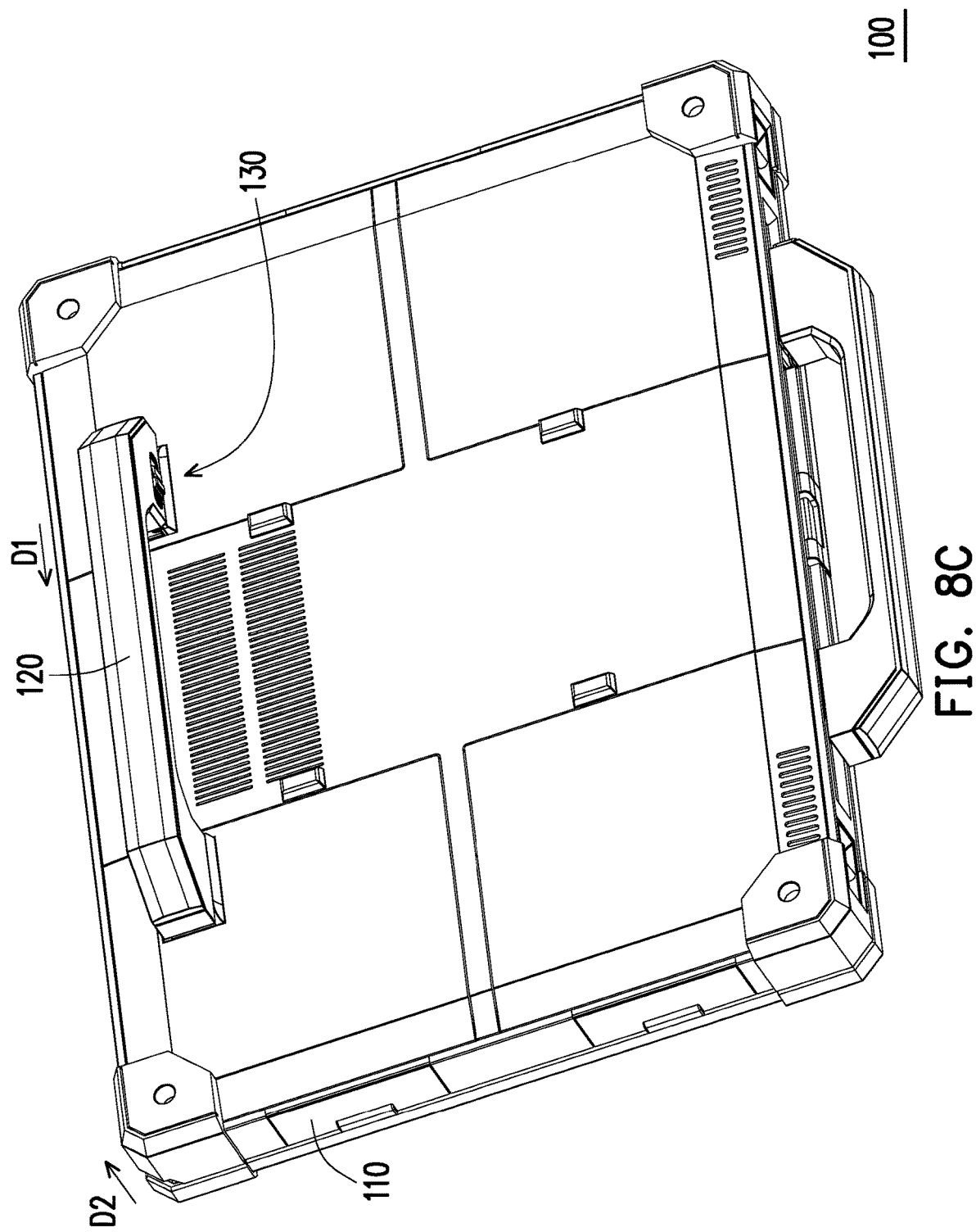

FIG. 8A to FIG. 8C illustrate an operation flow of the handle of FIG. 3. After the positioning column 132*a* of the positioning member 132 is moved away from the device main body 110 as described above, since the handle 120 is no longer fixed to the device main body 110 by the positioning member 132, the user may apply a force on the handle 20 to move the handle 120 from a position shown in FIG. 3 to a position shown in FIG. 8A relative to the device main body 110, and now the handle 120 is detached from a connecting portion 112 on the front side of the device main body 110. Then, the user may move the handle 120 to the bottom of the device main body 110 as shown in FIG. 8B, and apply a force on the handle 20 to move the handle 120 from a position shown in FIG. 8B to a position shown in FIG. 8C relative to the device main body 110, and now the handle 120 is combined with a connecting portion 114 on the bottom of the device main body 110. The handle 120 is, for example, adapted to move in a direction parallel to the first direction D1, and a sliding portion 122 thereof (shown in FIG. 4 and FIG. 5) is combined with or dethatched from a sliding chute of the connecting portion 112 or a sliding chute of the connecting portion 114 of the device main body 110.

Referring to FIG. 5 and FIG. 7, in the embodiment, the positioning mechanism 130 may include an elastic member 136, and the elastic member 136 is, for example, a spring and is connected between the positioning member 132 and the handle 120. When the user does not press the releasing member 134*a*, the releasing member 134*a* and the positioning member 132 may be restored from the position shown in FIG. 7 to the position shown in FIG. 5 through an elastic force of the elastic member 136, such that the positioning column 132*a* of the positioning member 132 inserts into the device main body 110.

Figure 9:
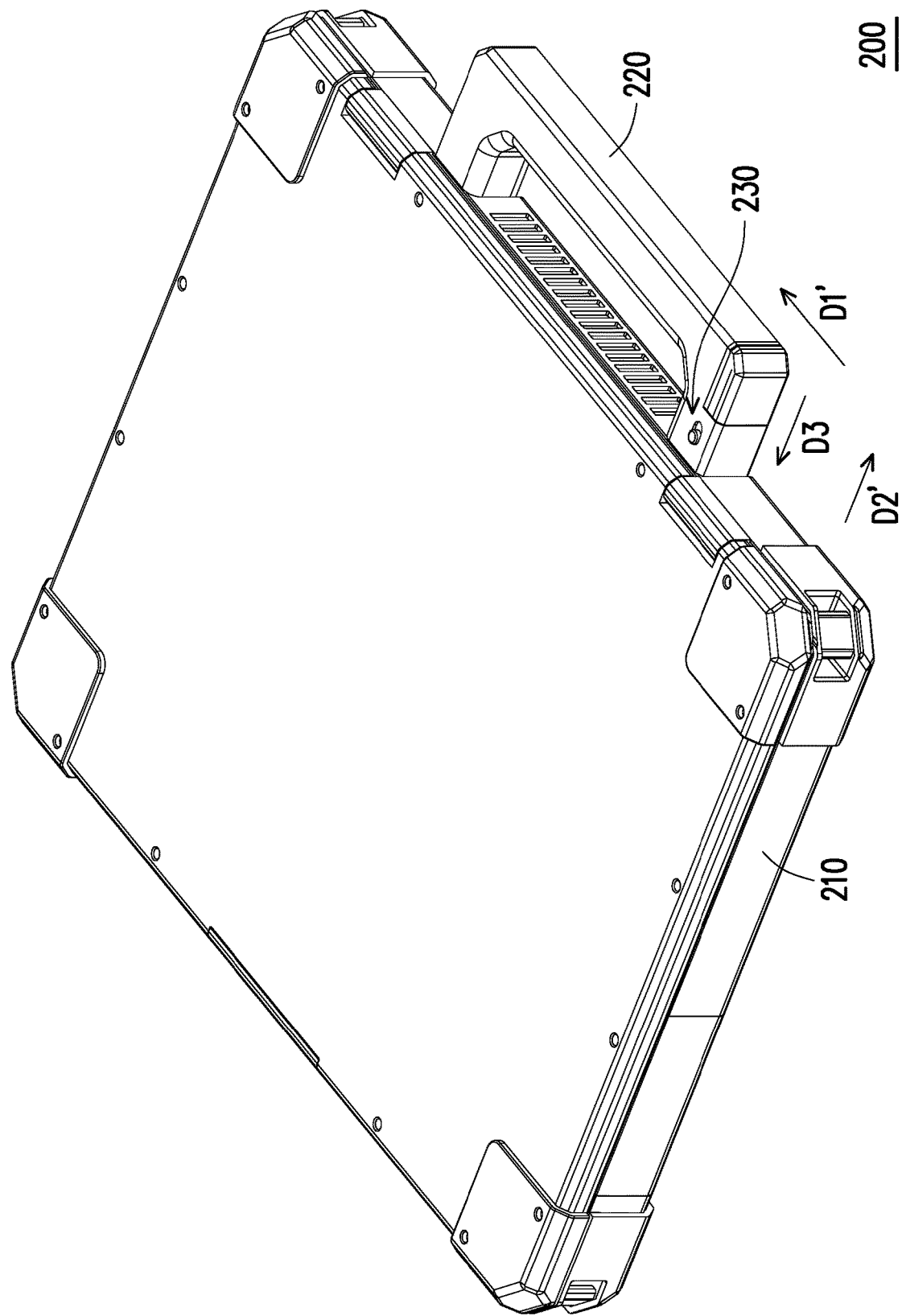
FIG. 9 is a partial three-dimensional view of an electronic device according to another embodiment of the invention.
Figure 10:
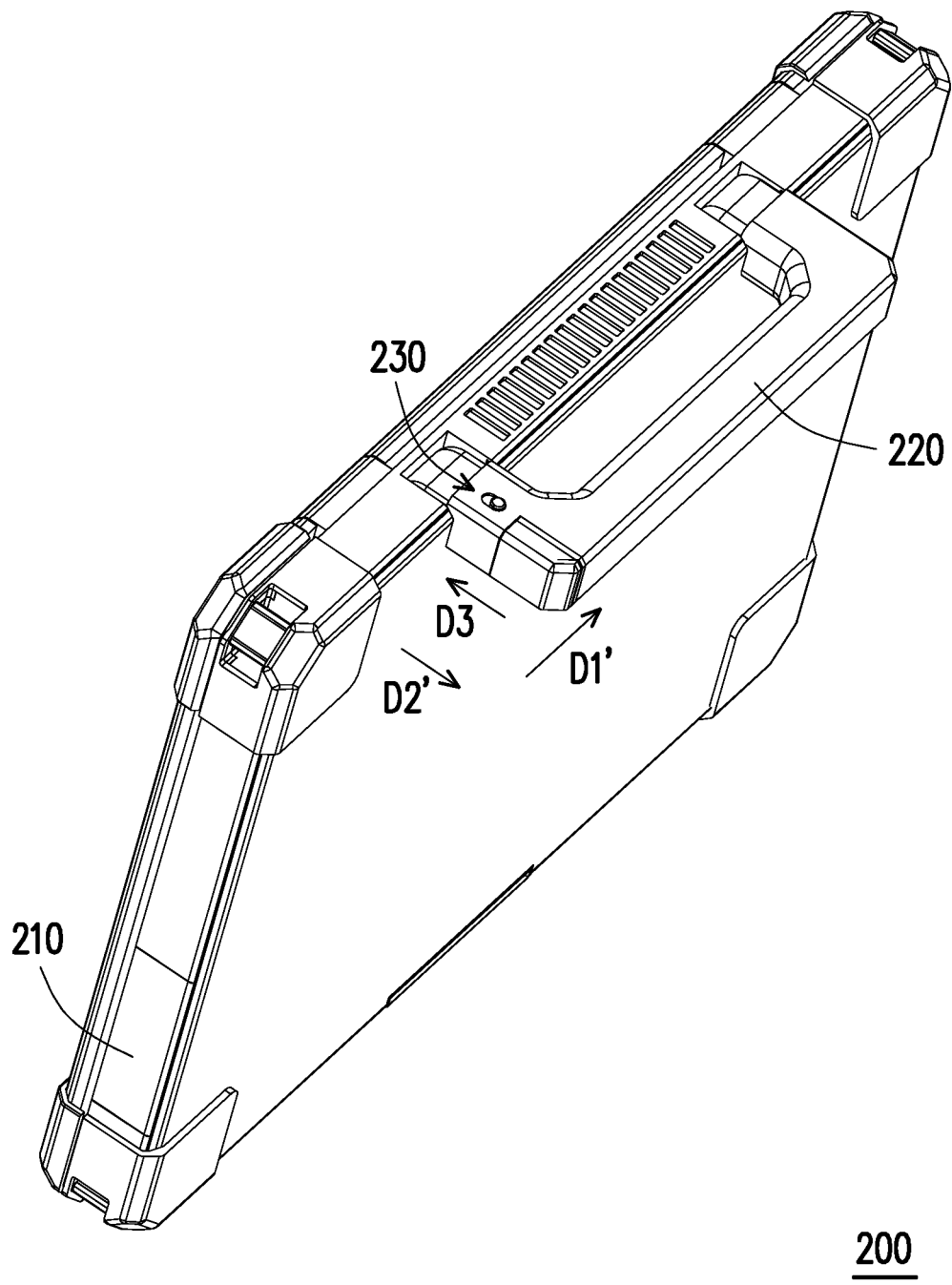
FIG. 10 illustrates a state change of a handle of FIG. 9.

FIG. 9 is a partial three-dimensional view of an electronic device according to another embodiment of the invention. FIG. 10 illustrates a state change of a handle of FIG. 9. A difference between the electronic device 200 of the embodiment and the aforementioned electronic device 100 is that the handle 220 is rotatably connected to the device main body 210, and is adapted to be rotated to a first position shown in FIG. 9 relative to the device main body 210 to present a first state, or rotated to a second position shown in FIG. 10 relative to the device main body 210 to present a second state. The first position is located a back side of the device main body 210, and the handle 220 located at the back side of the device main body 210 is adapted to be lifted by the user. The second position is, for example, located at the bottom of the device main body 210, and the handle 220 located at the bottom of the device main body 210 is adapted to be held be the user when the user supports the bottom of the device main body 210 by a single hand. Moreover, the handle 220 located at the bottom of the device main body 210 may lift the device main body 210 away from its placement surface, so as to reduce a dirt contact degree of the device main body 210 in military, industrial use or outdoor environments, and enhance flow efficiency of a heat dissipation airflow at the bottom of the device main body 210.

FIG. 11 to FIG. 16 illustrate operations of a positioning mechanism of FIG. 9. Referring to FIG. 11 to FIG. 16, the positioning mechanism 230 of the embodiment includes a positioning member 232 and an unlocking assembly 234. The positioning member 232 is movably disposed on the handle 220, and is adapted to position the handle 220 to the first state or the second state. The device main body 210 has a rotation shaft 212, the handle 220 is rotatably connected to the rotation shaft 212, and an engaging portion 232a of the positioning member 232 is adapted to be engaged to the rotation shaft 212 to prevent the handle 220 from rotating. The unlocking assembly 234 is rotatably disposed on the handle 220, and is adapted to release positioning of the positioning member 232 acted on the handle 220.

In detail, the unlocking assembly 234 of the embodiment includes a releasing member 234a and a locking member 234b. The releasing member 234a is slidably disposed on the handle 220 along a first direction D1' and is adapted to push the positioning member 232 through a bevel 234a1 thereof to release positioning of the positioning member 232 acted on the handle 220. The locking member 234b is slidably disposed on the handle 220 along a third direction D3 perpendicular to the first direction D1' and is adapted to lock the releasing member 234a. The lock member 234b, for example, stops the releasing member 234a through a stop portion 234b1 thereof. Detailed operation methods of the components are described below.

Figure 11:
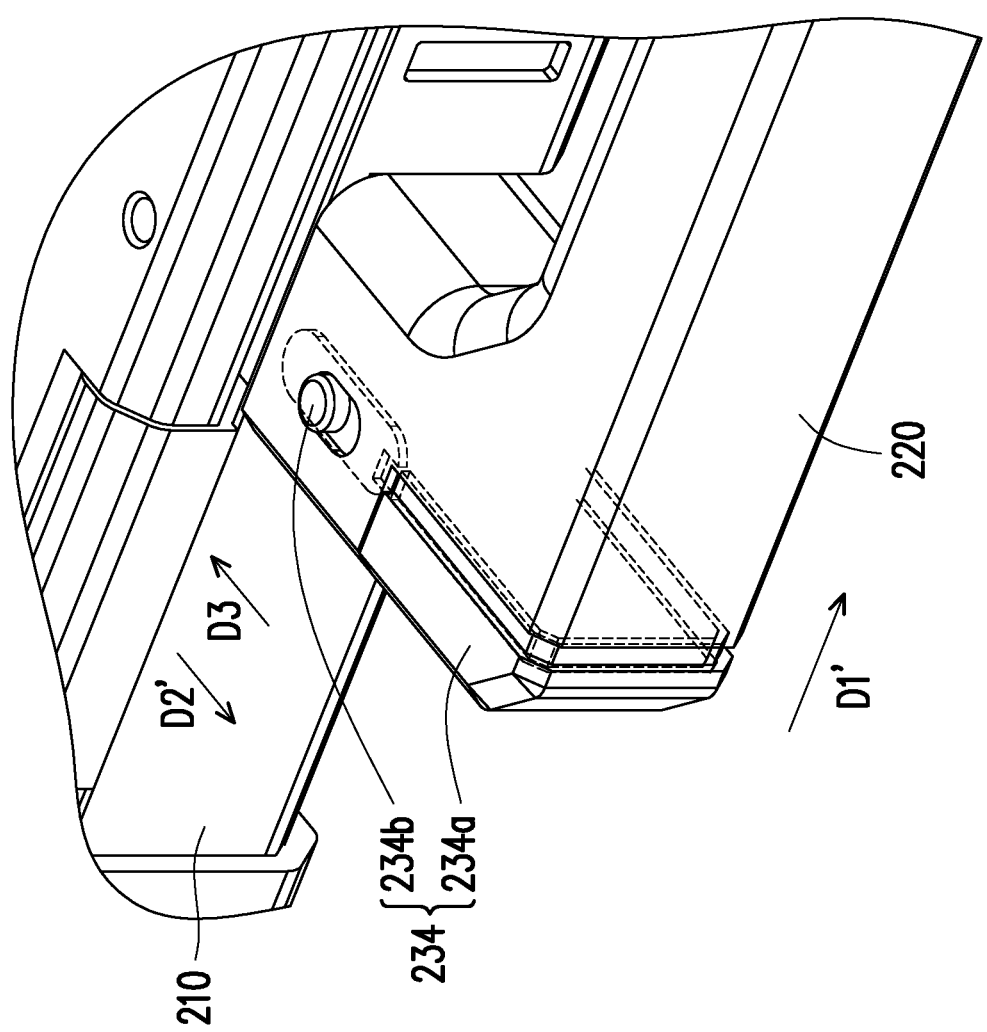
FIG. 11 to FIG. 16 illustrate operations of a positioning mechanism of FIG. 9.
Figure 12:
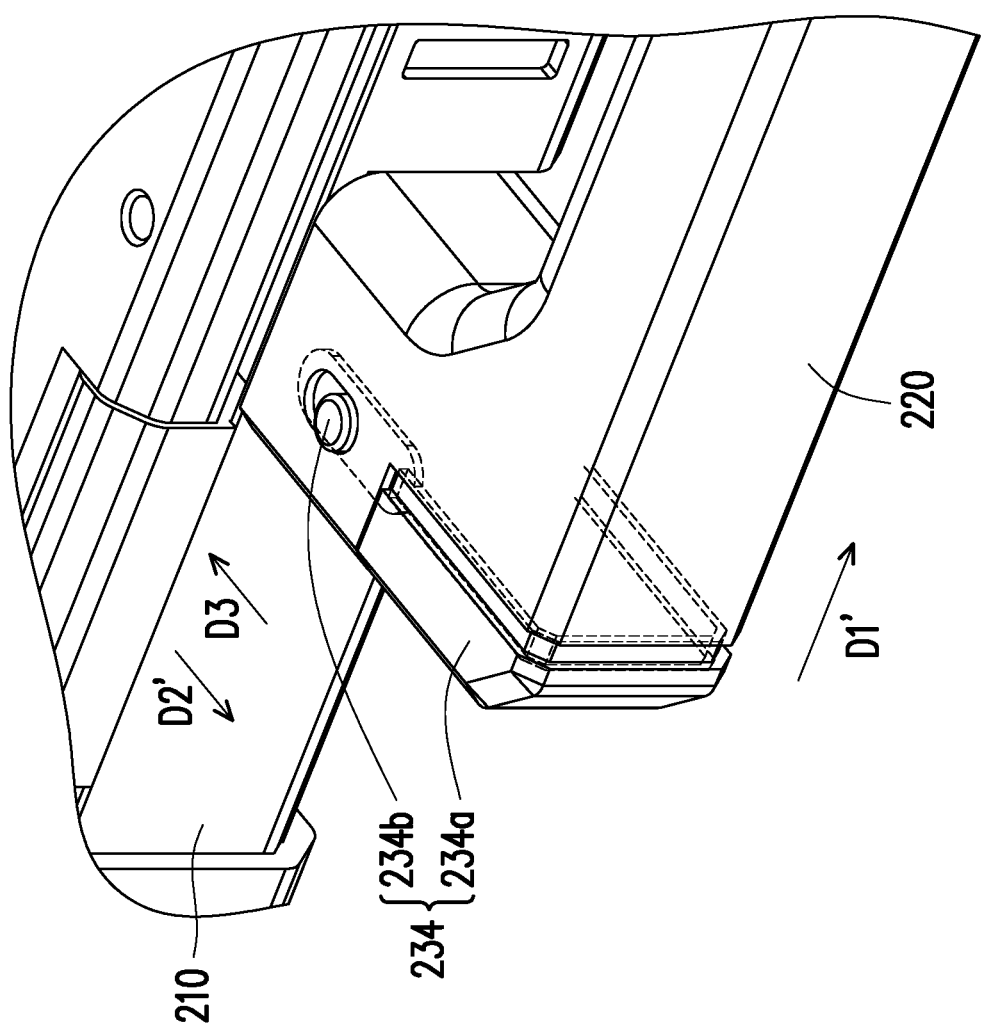
Figure 13:
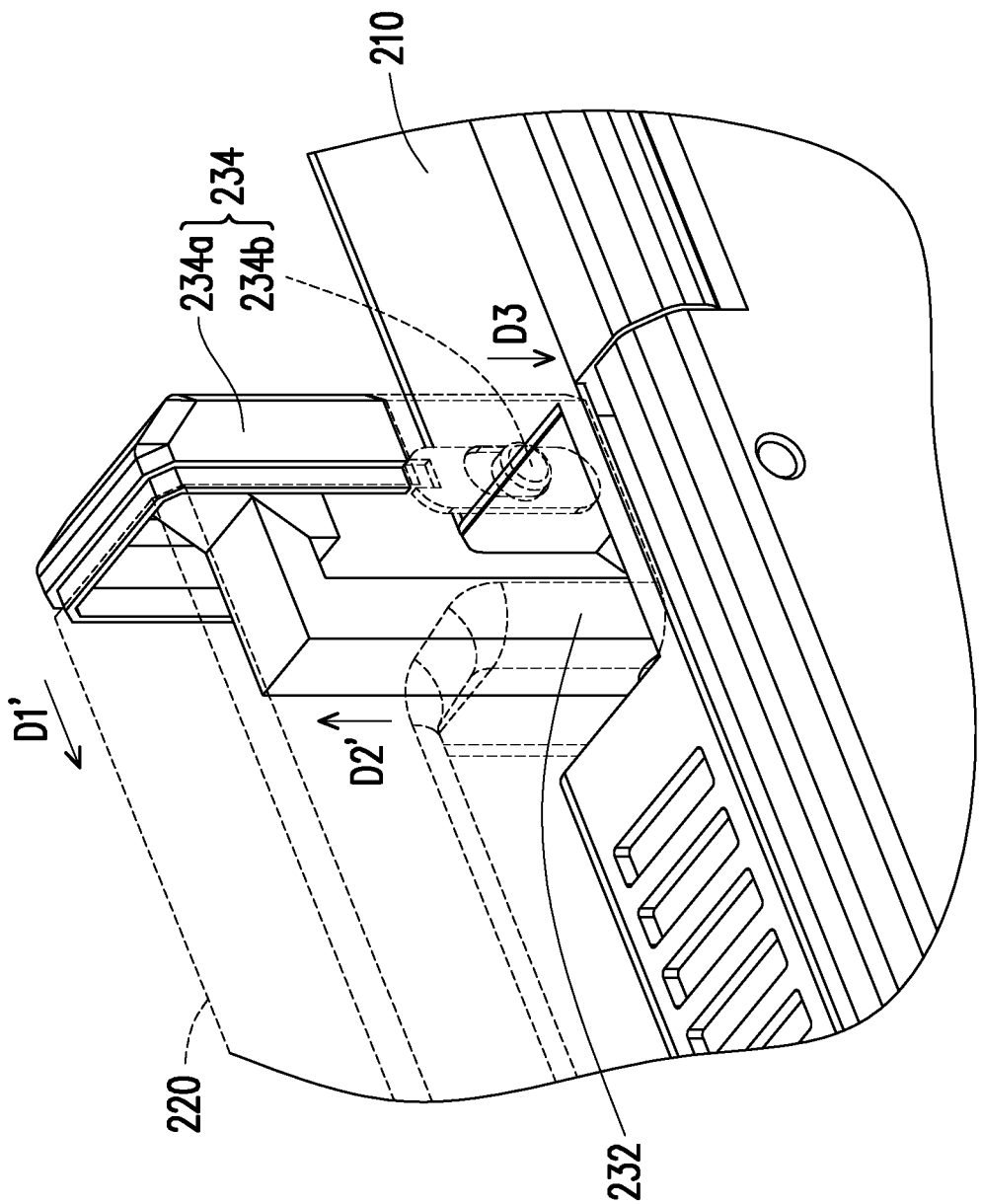
Figure 14:
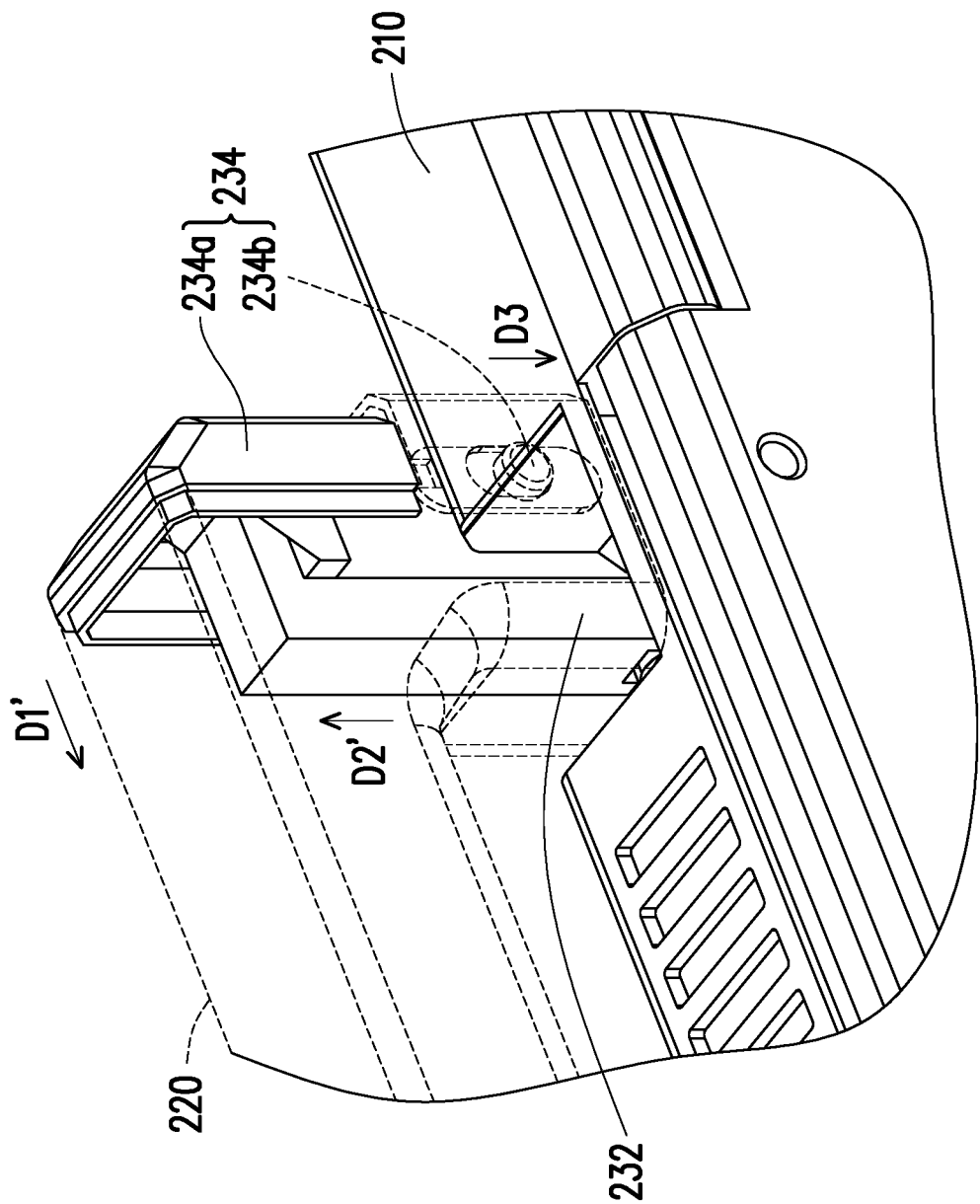
Figure 15:
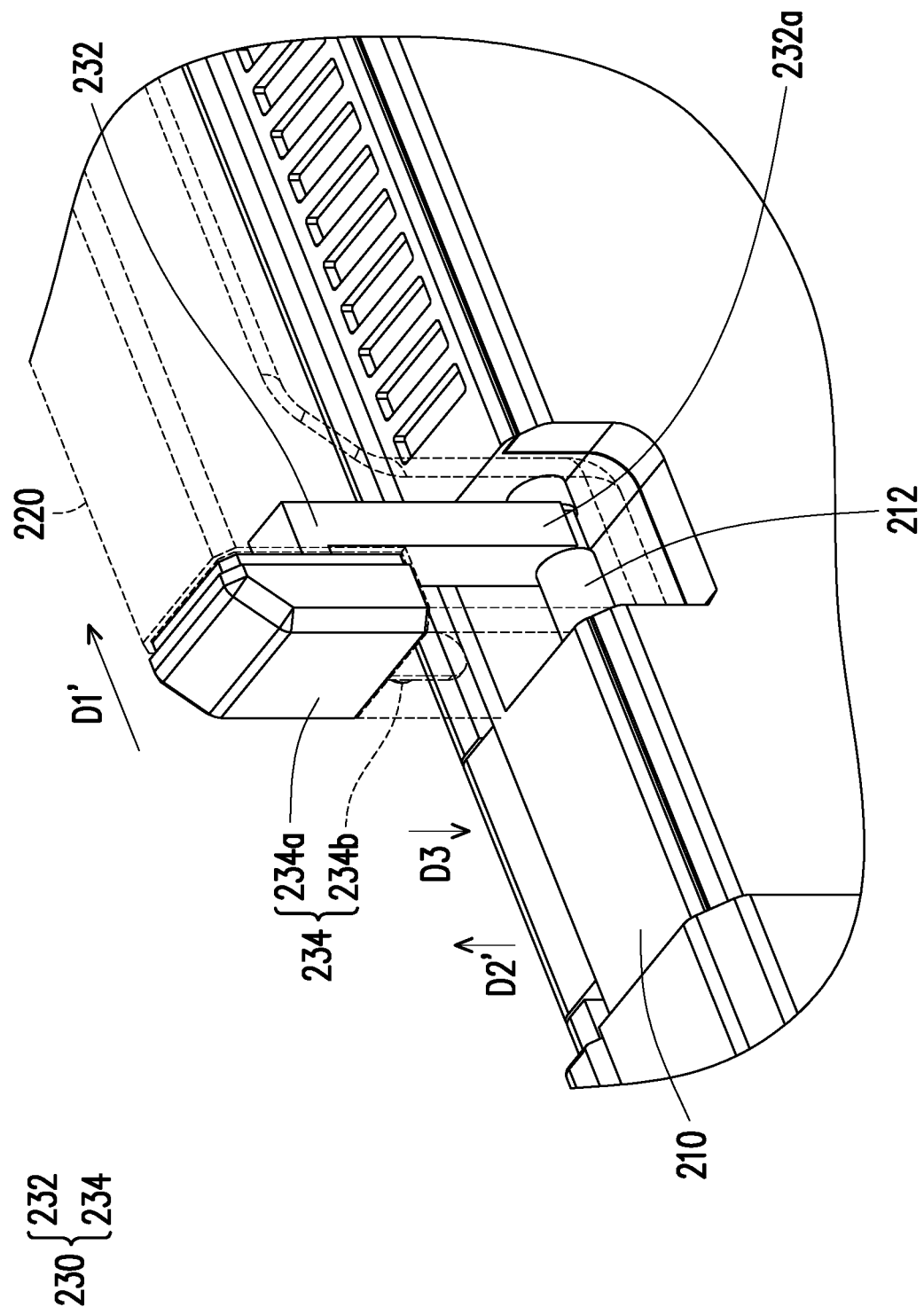
Figure 16:
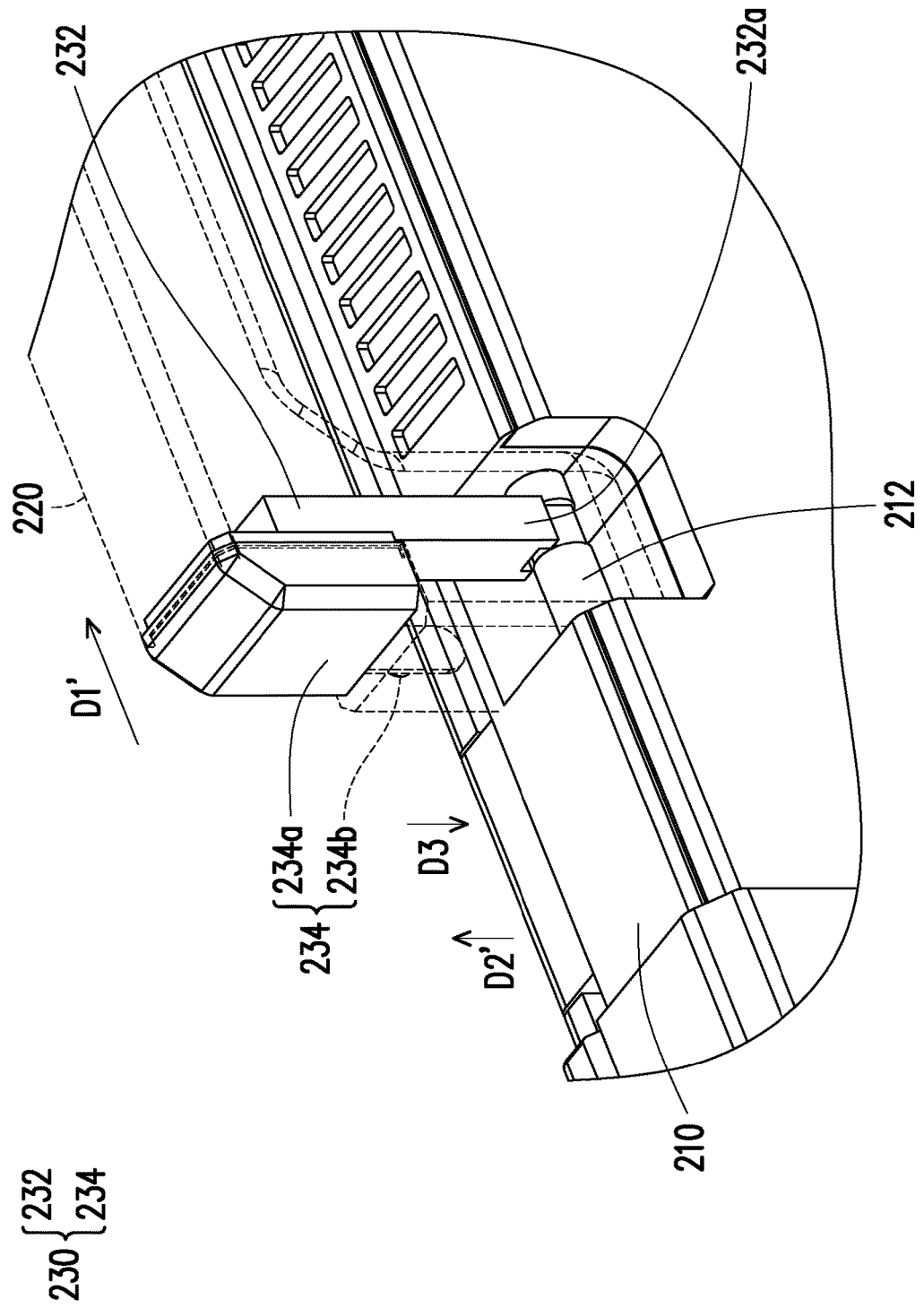

When the user wants to change the handle 220 from the first state shown in FIG. 9 to the second state shown in FIG. 10, the user may first push the locking member 234b, and the locking member 234b is moved from a position shown in FIG. 11 to a position shown in FIG. 12 along the third direction D3, and now the stop portion 234b1 of the locking member 234b is separated from the releasing member 234a, so that the releasing member 234a is not locked by the locking member 234b. Then, the user may press the releasing member 234a, and the releasing member 234a is moved from a position shown in FIG. 13 to a position shown in FIG. 15 along the first direction D1', and now a guide surface 232b of the positioning member 232 is pushed by the releasing member 234a to move the positioning member 232 from the position shown in FIG. 13 and FIG. 15 to the position shown in FIG. 14 and FIG. 16 along a second direction D2' perpendicular to the first direction Dr, and the engaging portion 232a of the positioning member 232 is separated from the rotation shaft 212 of the device main body 210. The guide surface 232b of the positioning member 232 is, for example, a bevel unparallel to the first direction D1' and the second direction D2'.

After the engaging portion 232a of the positioning member 232 is separated from the rotation shaft 212 of the device main body 210, since the handle 220 is no longer limited by the positioning member 232 to be unable to rotate relative to the device main body 210, the user may apply a force to the handle 220 to rotate the handle 220 relative to the device main body 210 from the position shown in FIG. 9 to the position shown in FIG. 10.

In the embodiment, the positioning mechanism 230 may include an elastic member (not shown), and the elastic member is, for example, a spring and is connected between the positioning member 232 and the handle 220. When the user does not press the releasing member 234a, the releasing member 234a and the positioning member 232 may be restored from the position shown in FIG. 14 and FIG. 16 to the position shown in FIG. 13 and FIG. 15 through an elastic force of the elastic member, such that the engaging portion 232a of the positioning member 232 is engaged with the rotation shaft 212 of the device main body 110.

In summary, in the electronic device of the invention, the handle may be connected to the device main body in two states, so as to respectively provide a lifting function and a stable holding function. When the electronic device is placed on a desktop, even if the handle is located between the desktop and the electronic device, since the handle is not the conventional soft cloth fixing belt, it will not make the device unstable and cause shaking of the device during an input operation such as typing or touch control.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. An electronic device, comprising:
   a device main body;
   a handle, adapted to be connected to the device main body in a first state, and adapted to be connected to the device main body in a second state; and
   a positioning mechanism, comprising:
      a positioning member, movably disposed on the handle, wherein the positioning member is adapted to position the handle to the first state and adapted to position the handle to the second state; and
      an unlocking assembly, movably disposed on the handle and adapted to release positioning of the positioning member acted on the handle.

2. The electronic device as claimed in claim 1, wherein the handle is adapted to be detachably connected to a first position of the device main body to present the first state, and the handle is adapted to be detachably connected to a second position of the device main body to present the second state.

3. The electronic device as claimed in claim 2, wherein the first position is located at a back side or a front side of the device main body, and the second position is located at a bottom of the device main body.

4. The electronic device as claimed in claim 1, wherein the handle is rotatably connected to the device main body, and the handle is adapted to be rotated to a first position relative to the device main body to present the first state, and the handle is adapted to be rotated to a second position relative to the device main body to present the second state.

5. The electronic device as claimed in claim 4, wherein the first position is located at a back side or a front side of the device main body, and the second position is located at a bottom of the device main body.

6. The electronic device as claimed in claim 1, wherein the unlocking assembly comprises a releasing member and a locking member, the releasing member is slidably disposed on the handle and is adapted to push the positioning member to release positioning of the positioning member acted on the handle, and the locking member is slidably disposed on the handle and is adapted to lock the releasing member.

7. The electronic device as claimed in claim 6, wherein the locking member has a stop portion, and the stop portion is adapted to stop one of the releasing member and the positioning member.

8. The electronic device as claimed in claim 6, wherein the positioning member has a guide surface, the releasing member is adapted to move along a first direction to push the guide surface to drive the positioning member to move along a second direction, and the guide surface is not parallel with the first direction and the second direction.

9. The electronic device as claimed in claim 6, wherein the positioning member comprises a positioning column, and the positioning column is adapted to insert into the device main body to position the handle to the device main body.

10. The electronic device as claimed in claim 6, wherein the device main body has a rotation shaft, the handle is rotatably connected to the rotation shaft, the positioning member comprises an engaging portion, and the engaging portion is adapted to be engaged to the rotation shaft to prevent the handle from rotating.

* * * * *